Oct. 9, 1923.
H. V. HAIGHT
1,470,077
PLATE VALVE UNLOADER
Filed June 19, 1922
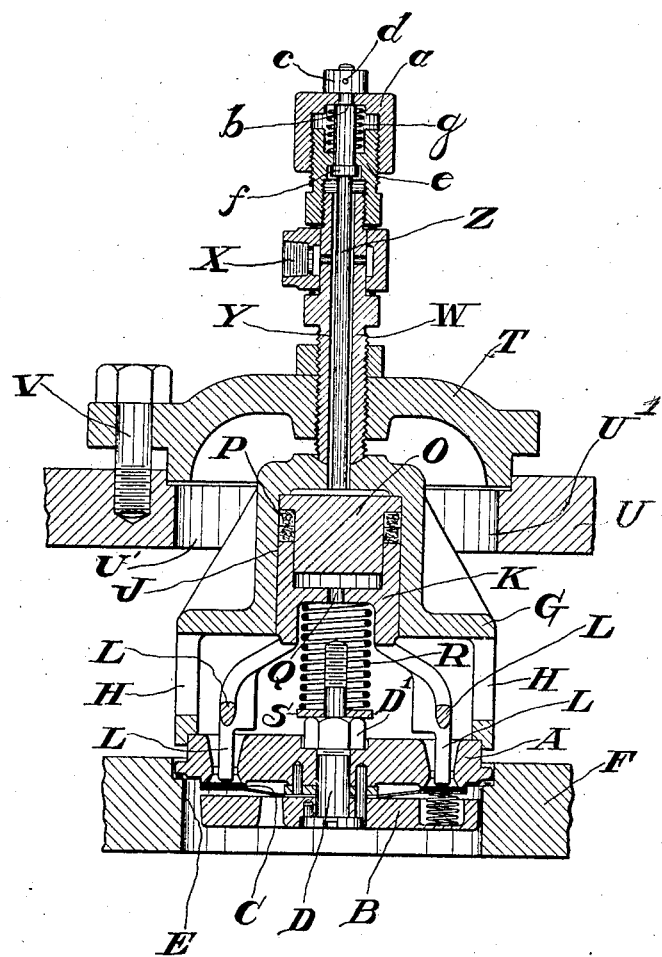
Inventor
Harry V. Haight
By His Attorney Patented Oct. 9, 1923.

1,470,077

UNITED STATES PATENT OFFICE.

HARRY VERCOE HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

PLATE-VALVE UNLOADER.

Application filed June 19, 1922. Serial No. 569,473.

*To all whom it may concern:*

Be it known that I, HARRY V. HAIGHT, a citizen of the Dominion of Canada, a resident of Sherbrooke, Province of Quebec, Canada, have invented a certain Plate Valve Unloader, of which the following is a specification accompanied by drawing.

This invention relates to plate valves, but more particularly to a plate valve unloader for compressors, by means of which a plate valve is held open for unloading purposes.

The objects of the invention are to secure a simple and efficient device, which will not readily get out of order, for holding a plate valve away from its seat when required for unloading, and to construct the device in such manner that, in addition to automatic operation by fluid pressure, it may be conveniently operated by hand when desired.

The invention is illustrated in one of its preferred forms in the accompanying drawing, which is a side elevation in longitudinal section of a plate valve unloader embodying the invention.

Referring to the drawing, so much of a plate valve is shown as will serve to indicate the type of valve chosen to illustrate the invention, and in this instance, the plate valve structure includes the ported valve seat A, the stop plate B and the valve plate C cooperating with the seat A. The parts are held together by means of the usual stud D and nut D' and the plate valve structure is adapted to lie in an opening E in the cylinder wall F of a compressor. In the present instance, the valve is shown as an inlet valve, but will not be further described, as its details form no part of the present invention, and any suitable plate valve may have my invention applied thereto.

A valve cage G is located over the valve seat A and is provided with the arms H bearing on the valve seat and is also formed with an operating cylinder J in which a piston is adapted to move. The piston may be of any suitable construction, but I prefer to construct the piston with a body portion K having extensions or fingers L adapted to bear upon the valve plate C when required and hold the valve open. A piston head O extends into the body K and packing material P is arranged between the head O and the body K so that the packing is always tight. While this is a preferable construction, I am not to be understood as limiting the invention to the type of piston shown.

The piston body K is provided with a vent Q in its under portion and a spring R is preferably located between the piston body and a washer S on the stud D for retracting the piston after it has been moved forward.

A cover T is adapted to be secured to the compressor outer casing U in any suitable manner, as by means of the screws V and is located opposite the valve opening E in the compressor cylinder wall F. The upper portion of the valve cage G lies in the opening U' in the compressor outer casing U, but does not touch the sides of the opening, so that the cage and associated parts may be readily removed.

A suitable device as for instance, a set screw W threaded into the cover T, cooperates with the valve cage G and bears upon the same to hold the cage in position on the valve seat A. Suitable means are provided for supplying fluid pressure to the operating cylinder J in the cage G, and for this purpose I prefer to supply the motive fluid through the inlet connection X and thence through the hollow bore Y of the set screw W to the operating cylinder J. Fluid pressure upon the piston head O will force the piston and extensions or fingers L outwardly in a direction to move the valve plate C away from its seat A. Release of pressure will permit the retracting spring R to move the piston in the opposite direction and permit the valve to function in the usual way.

Means are also provided for manually actuating the piston in order to unload by hand and for this purpose a rod Z extends through the set screw W and is adapted to bear on the piston head O. In order to force the unloading rod Z against the piston head, an internally screw threaded cap *a* is provided at the outer end of the rod held upon the shoulder *b* by the washer *c* and pin *d*. The cap *a* cooperates with the externally threaded connection *e* which is as shown threaded to the outer end of the set screw W.

A stop *f* on the rod Z limits the outward movement of the rod Z and the cap *a*, and a spring g adapted to be compressed between the cap a and the connection e, aids in withdrawing the rod Z.

I claim:

1. A plate valve unloader comprising a plate valve including its seat, stop plate and stud adapted to lie in a valve opening in the cylinder wall of a compressor, a valve cage over the valve seat, the upper portion of the cage being adapted to lie freely in an opening in the compressor cylinder casing, whereby the cage may be readily removed from the casing, an operating cylinder in said cage and a piston in said cylinder having fingers adapted to bear upon the plate valve and hold it from its seat when desired, a spring interposed between the valve stud and the piston, a cover adapted to be secured to the compressor outer casing opposite the said valve opening, a set screw in the said cover cooperating with the valve cage to hold the cage in position on the valve seat, means for supplying fluid pressure through the set screw to the said operating cylinder, and manual means extending centrally through the set screw for actuating the piston in order to unload by hand.

2. A plate valve unloader comprising a plate valve including its seat stop plate and stud adapted to lie in a valve opening in the cylinder wall of a compressor, a valve cage over the valve seat, the upper portion of the cage being adapted to lie freely in an opening in the compressor cylinder casing, whereby the cage may be readily removed from the casing, an operating cylinder in said cage and a piston in said cylinder having fingers adapted to bear upon the plate valve and hold it from its seat when desired, a spring interposed between the valve stud and the piston, a cover adapted to be secured to the compressor outer casing opposite the said valve opening, a set screw in the said cover cooperating with the valve cage to hold the cage in position on the valve seat, means for supplying fluid pressure through the set screw to the said operating cylinder, a rod extending centrally through the set screw and adapted to bear on said piston, and manual means for forcing said rod longitudinally in order to actuate the piston and unload by hand.

3. A plate valve unloader comprising a plate valve and its seat, stop plate and stud adapted to lie in a valve opening in the cylinder wall of a compressor, a valve cage over the valve seat having an operating cylinder, the upper portion of the cage being adapted to lie freely in an opening in the compressor cylinder casing, whereby the cage may be readily removed from the casing, a piston in said cylinder consisting of a body portion having extensions adapted to hold the plate valve open when desired, a piston head on the body and a packing between the body and head, a cover in the compressor outer casing opposite the valve opening and means extending through the said cover for holding the cage in position and also for supplying fluid pressure to the said operating cylinder.

In testimony whereof I have signed this specification.

HARRY VERCOE HAIGHT.